(12) United States Patent
Heitele

(10) Patent No.: US 7,455,769 B2
(45) Date of Patent: Nov. 25, 2008

(54) FILTER APPLIANCE AND INNER CONTAINER FOR A FILTER APPLIANCE

(75) Inventor: Bernd Heitele, Taunusstein (DE)

(73) Assignee: Brita GmbH, Taunusstein (DE)

( * ) Notice: Subject to any disclaimer, the term of this patent is extended or adjusted under 35 U.S.C. 154(b) by 504 days.

(21) Appl. No.: 10/520,737

(22) PCT Filed: Jul. 9, 2003

(86) PCT No.: PCT/EP03/07404

§ 371 (c)(1), (2), (4) Date: Jan. 10, 2005

(87) PCT Pub. No.: WO2004/007374

PCT Pub. Date: Jan. 22, 2004

(65) Prior Publication Data

US 2006/0032796 A1     Feb. 16, 2006

(30) Foreign Application Priority Data

Jul. 10, 2002  (DE) ............................... 102 31 096

(51) Int. Cl.
*C02F 1/28* (2006.01)
*C02F 1/42* (2006.01)

(52) U.S. Cl. .................. 210/284; 210/289; 210/315; 210/317; 210/418; 210/434; 210/502.1

(58) Field of Classification Search ............... 210/266, 210/287, 289, 314–317, 428, 434, 502.1, 210/284, 418

See application file for complete search history.

(56) References Cited

U.S. PATENT DOCUMENTS 2,349,830 A * 5/1944 Olsen et al. ................ 4/675

(Continued)

FOREIGN PATENT DOCUMENTS

DE  30 03 676 A1  8/1981

(Continued)

OTHER PUBLICATIONS

International Search Report for PCT/EP2003/007404, Oct. 2003.

(Continued)

*Primary Examiner*—Matthew O Savage
(74) *Attorney, Agent, or Firm*—Hudak, Shunk & Farine Co. LPA

(57) ABSTRACT

A filter appliance including a dilution device, wherein the diluted portion remains largely constant when the entire volume flow is modified. Said filter device is characterized in that the flow characteristic—defined by the pressure loss function $\Delta p_B(\dot{V}_B)$—of the constituents of the dilution line B is adapted to the flow characteristic defined by the pressure loss function $\Delta p_A(\dot{V}_A)$—of the constituents of the filter line A, in such a way that the dilution condition holds good for at least one diluted portion X where $X=\dot{V}_B/\dot{V}_A+\dot{V}_B$ for volume flows between be $\dot{V}_1=10$ liters per hour and $\dot{V}_2=120$ liters per hour, first volume flow range, for at least one second volume flow range of at least 5 liters per hour inside the first volume flow range, $\Delta p_A(\dot{V}_A)$ designating the pressure drop over the dilution line B according to the respective volume flows $\dot{V}_A$, $\dot{V}_B$ in liters/min of the water in lines A and B.

25 Claims, 13 Drawing Sheets

U.S. PATENT DOCUMENTS

| | | | |
|---|---|---|---|
| 3,370,708 A * | 2/1968 | Hultgren et al. | 210/130 |
| 4,943,371 A * | 7/1990 | Tsviatko et al. | 210/101 |
| 5,427,683 A | 6/1995 | Gershon et al. | |
| 5,908,553 A * | 6/1999 | Reid | 210/206 |

FOREIGN PATENT DOCUMENTS

| | | |
|---|---|---|
| DE | 44 22 709 A1 | 1/1996 |
| DE | 196 48 405 | 10/1998 |
| DE | 199 58 648 | 6/2001 |
| EP | 0668243 | 8/1995 |
| EP | 1 106 578 A1 | 6/2001 |
| EP | 1 160 204 A2 | 12/2001 |
| EP | 1106578 | 12/2001 |
| SU | 1116417 | 9/1984 |

OTHER PUBLICATIONS

English Language translation of International Preliminary Examination Report for PCT/EP2003/007404, Oct. 2004.

English Language translation of International Preliminary Examination Report for PCT/EP2003/007402, Aug. 2004.

* cited by examiner

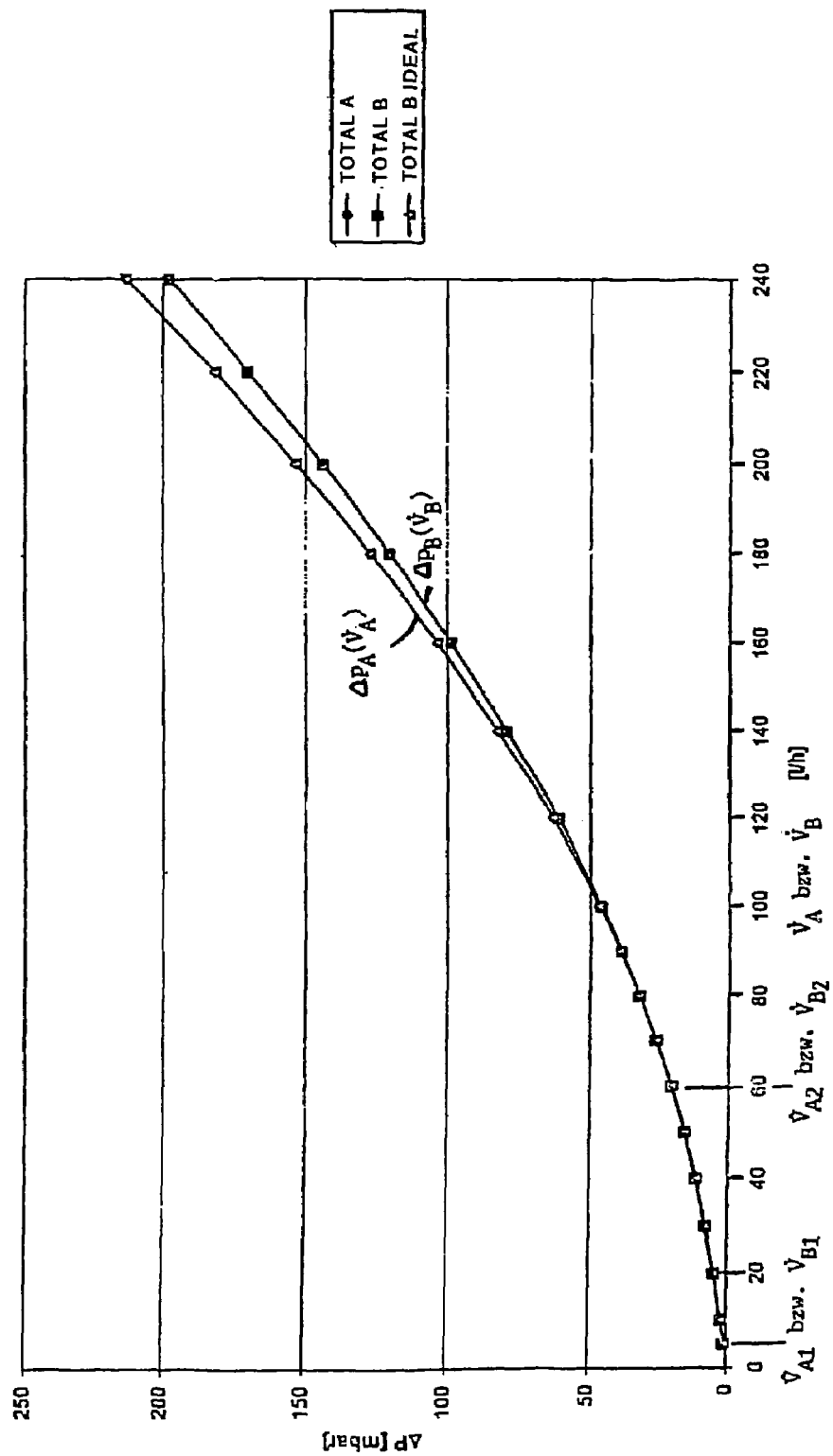

FILTER APPLIANCE AND INNER CONTAINER FOR A FILTER APPLIANCE

FIELD OF THE INVENTION

The invention relates to a filter device for purification and/or at least for partial dealkalization of raw water, comprising of a raw water inlet and a pure water outlet, with a flow channel segment and with a filter line A with a first filtration segment, and with a distribution valve and a blending line B with a second filtration segment, which is connected by means of a separation device with the raw water inlet on one side, and with a connection device with the pure water outlet on the other side, whereby both the filtration segments are arranged in an inner container. The invention is also related to an inner container for this kind of filter devices.

BACKGROUND OF THE INVENTION

In the filter devices, in particular those with dealkalization filters, which are used in beverage and coffee vending machines, a blending device is employed in general. In the latter, usually large water filters are used, which typically have inner containers with volume of the order of 1.5 to 25 liters, and are filled, for instance, with an ion exchanger resin or other materials, which can mainly remove the carbonates, and, where applicable, depending on the type of the filter material used, also nitrates, chlorides and sulfates, or other substances, from the water.

Since the carbonate hardness of the raw water is not always and everywhere the same, and, on the other hand, since the carbonate hardness has a significant effect on the taste, particularly of coffee, it is necessary to blend the filtered water with unfiltered raw water.

In DE 196 48 405.7, a terminal multiplexer for large sized water filters has been described, which is comprised of an inlet line for inflow into the filter and an outlet line for the outflow of the filtered water from the filter, whereby a metering valve is provided in a bypass connecting the inlet and the outlet lines, which enables adjustment, as required, of the blending of the filtered and unfiltered water in the outlet line.

However, it has been found that such blending equipment can ensure the adjusted blended portion only if the volume flow is high, that is, if the volume flow, which also depends very much on the suction capacity of the consumer device, is in the range of, for example, 100 to 300 l/h. Volume flow always refers to the volume flow with a continuous flow.

If the volume flow is low, there is deviation from the value preset using the distribution valve, such that the unfiltered raw water portion increases with the decreasing volume flow. In that case, it is necessary to correct it with a metering valve, which has hitherto not been easy, because the deviation from the preset amount of blending is not known in general.

Furthermore, there are distribution valves, which affect both the filter line as well as the blending line during the adjustment. Such distribution valves require a lot of mechanical manipulation and are consequently expensive.

DE 199 58 648.9 refers to a water filter device, which is comprised of a separation device for dividing the raw water flowing in through the inlet into two partial flows. Both the partial flows pass in part through different filter lines. Thereby, the ratio of the partial flows can be adjusted by means of a valve.

With this filter device, the problem is to be solved in such a fashion that, on one hand, even when the water taken out from the device is not completely dealkalized, all the other undesirable substances are completely removed from the water. In order to achieve this, one partial flow flows through the commonly used ion exchanger resin and, for example, activated carbon, and the other partial flow flows, for example, only through activated carbon. The problem of changing the blended portion with respect to the total quantity for low flow rates is, however, still not addressed here.

In DE-AS 15 36 899 a combined pressure filter with upward flow and downward flow filters is described, in which the filtrate is removed evenly from the entire cross section of the fine grain filter mass with as low pressure decline as possible, without using a device for removal. In this case, the upward flow filter is built within the downward flow filter. The liquid to be filtered is supplied not only from above but also from below, so that both the filtration flows unite in the downward flow filter.

Hence, the task of the invention is to create a filter device with a blending device and an inner container, which forms a constituent part of the filter device, in which the blended portion remains largely constant with the variations in the total volume of the flow.

This task is solved with a filter device, in which the flow characteristics of the component of the blending line B, defined by the pressure loss function $\Delta p_B(\dot{V}_B)$ are adapted according to the flow characteristics of the component of the filter line A, defined by the pressure loss function $\Delta p_A(\dot{V}_A)$, such that the blending condition is satisfied for at least one blended portion X with $X=\dot{V}_B/(\dot{V}_A+\dot{V}_B)$ for volume flows between $\dot{V}_1=10$ liters per hour to $\dot{V}_2=120$ liters per hour (first volume flow range) for at least a second volume flow range of at least 5 liters per hour within the first volume flow range:

$$\frac{\left|\dot{V}_B \frac{1-X}{X} - \dot{V}_A\right|}{\dot{V}_A} \leq 0.15 = G$$

whereby G indicates the threshold value of the blended condition, $\Delta p_A(\dot{V}_A)$ indicates the pressure decline in the pressure in the filter line A and $\Delta p_B(\dot{V}_B)$ indicates the pressure decline in the blending line B, in dependence of the volume flows $\dot{V}_A$, $\dot{V}_B$ in liters/min of the water in the lines A and B.

The pressure loss function $\Delta p(\dot{V})$ refers to the function which describes the pressure loss between the branching points of the distributor and the connection devices. Thereby, the throttles that may possibly be arranged in or before the distributor or analogous devices are not taken into consideration.

The pressure loss functions are obtained by adding the corresponding functions of the successively arranged components in the lines A and B. Thereby, for the sake of simplification, for instance, the pipe connection of the line A to a flow channel section is shown together as one.

The filtration segments are the filters arranged in it, which have decisive influence on the flow characteristic, and consequently on the corresponding pressure loss function, in that segment.

It turned out that by adapting the layout of the components, the pressure loss function $\Delta p_B$ can be adjusted according to the pressure loss function $\Delta p_A$ to such an extent that for different volume flows, the set blend portion remains essentially the same.

While designing the components of the lines A and B, at first a blend portion X is given, which preferably corresponds to the blend portion, with which the filter device is usually to be operated. This blend portion is also called basic layout.

Further, the components are designed for a volume flow range, which responds especially sensitively to the blend portion. It was found that, while designing the components, it is not necessary to take the entire range of the volume flow area into account, for which the filter device can be used. Rather, it was found that, in the design, a first volume flow range, which can be defined by the thresholds values $\dot{V}_1=10$ liters per hour and $\dot{V}_2=120$ liters per hour, and within this first range, at least one second volume flow range, with range of at least 5 liters per hour, is sufficient. Main influence on the flow characteristic of the pressure loss function $\Delta p_B(\dot{V}_B)$ within this range between $\dot{V}_1$ and $\dot{V}_2$ is exercised by the size of the filter device, and, in particular by the volume of the inner container, so that the range of the second volume flow can fluctuate within the limit $\dot{V}_1$ and $\dot{V}_2$.

When the adaptation of the components of the filter device was undertaken, in the second volume range, it was found that even in case of smaller volume flows, that is, in the range from $\dot{V}_1$ up to the beginning of the second volume flow range, the blend portion virtually does not change with the variations in the total volume of the flow.

Preferably, the threshold value G is 0.10, especially 0.05. Preferred values for the range width of the second volume flow range are at least 10 liters per hour, especially at least 15 liters per hour.

Preferably the distribution valve and the second filtration section are designed in such a way that, in the second volume flow range, the following condition is fulfilled: $\Delta p_{B1}(\dot{V}_B) < \Delta p_{B2}(\dot{V}_{B2})$, whereby $\Delta p_{B1}(\dot{V}_B)$ indicates the pressure loss function of the distribution valve and $\Delta p_{B2}(\dot{V}_B)$ indicates the pressure loss function of the second filtration segment.

In this case, the flow characteristic of the second filtration segment dominates the flow characteristic of the entire blending line B.

When adapting the components, it is preferable that the distribution valve is in a completely open state and that the flow characteristic $\Delta p_{A1}(\dot{V}_A)$ of the flow channel segment is adjusted according to the flow characteristic $\Delta p_{B1}(\dot{V}_B)$ of the distribution valve.

The layouts of the two filtration segments are then matched to one another in such a way that the pressure loss functions $\Delta p_{A2}(\dot{V}_A)$ and $\Delta p_{B2}(\dot{V}_B)$ of the first and the second filtration segments are approximately equal to each other.

Preferably, the flow areas $Q_A$ and $Q_B$, are expressed in m$^2$, and the distances $h_A$ and $h_B$, expressed in m, of the first and the second filtration segments, are designed in such a way that the following equation for the pressure loss factors $D_A$ and $D_B$, expressed in kPah/m$^2$, is satisfied for both filtration segments:

$$D_A = \frac{X}{1-X} D_B \text{ whereby}$$

$$D_A = \int_0^{h_A} \frac{S_A(h)}{Q_A(h)} dh$$

$$D_B = \int_0^{h_B} \frac{S_B(h)}{Q_B(h)} dh$$

and $S_A(h)$ and $S_B(h)$ represent the respective pressure loss coefficients of the filter material in kPah/m$^3$.

If there is granular material, the distances $h_A$ and $h_B$ are defined by the heights of the filter beds. In case of sinter blocks, which are built, for example, cylindrically with a central filtrate channel and the flow enters from the outside, the distance is defined by the thickness of the wall of the cylinder. The cylinder jacket forms, in this example, the region of the flow.

Preferably, the cross sectional area $Q_A$ lies in the range of 5 cm$^2$ to 600 cm$^2$ and $Q_B$ lies in the range of 1 cm$^2$ to 300 cm$^2$.

In case of filter granular material, the pressure loss coefficients are determined by the grain size and in case of sinter bodies by the pore size.

The grain sizes lie preferably in the range of 0.1 to 2 mm, whereby these values correspond to the mean value with normal distribution. Preferably, the activated carbon is used as the filter granular material.

The filter material of the filter lines A and/or B is preferably a filter block, in particular a sintered filter block, with pore sizes in the range of 0.1 to 100 μm. These values correspond to the mean value of the pore sizes of a normal distribution.

Instead of the filter granular material or the sinter blocks, filter membranes can also be used.

In context of this invention, it is also possible to connect the two filtration segments together, so that, for example, the filter material is used in common in both the lines A and B.

Preferably, the outlet of the second filtration segment leads the flow into the first filtration segment. The junction can be made in the region of the second half of the first filtration segment.

The inner container for such a filter device is characterized in that it comprises of a first filter chamber, in which a second filter chamber is mounted, whereby each filter chamber is connected to the partial flows coming in from above, and a common main collection drain, built below the filter chambers, with pure water outlet for collection of the filtered water from the partial flows. The first filter chamber forms the filtration segment of the filter line A and the second filter chamber forms the filtration segment of the blending line.

A space-saving embodiment is possible through integration of the second filter chamber with the first filter chamber.

The two partial flows are assigned to the two filter chambers and can be, if necessary, further subdivided into chamber segments or subchambers. At least one of the two filter chambers is preferably subdivided into at least two chamber segments, in which different filter materials are arranged.

It is also possible to arrange the filter material in the main collection chamber and/or in the pure water outlet. It is thus possible to realize a common after-filter.

Preferably, both filter chambers extend up to the collection chamber, which is located at the bottom wall of the inner container, whereby the first filter chamber forms an annular jacket encircling the second filter chamber. Thus a layout with rotation symmetry is achieved, which enables central, preferably upward, flow of the fluid of the filter line A and the blending line B.

This type of embodiment can be achieved cost-effectively even with a few components. To that end, preferably an annular drainage plate with filtrate orifices is arranged on the bottom wall of the inner container, which has radial collection channels on the side facing the bottom wall and a cupular insert chamber extending upwards from the drainage plate.

Another embodiment comprises essentially of three components, placed within one another, and consists of an inner bowl, a filter bowl and an outer bowl.

The pure water outlet from the collection chamber can be arranged on the side below the inner container. In order that the outflow of the pure water is at the upper side of the inner container, it is advantageous to build an ascending pipe within the inner container, which can preferably be a double-walled tube, through which a partial flow can also flow into one of the two filter chambers.

The double-walled tube is built preferably in the lid and can be built between the cupular chamber or the inner and outer bowls and the lid.

The outer tube of the double-walled tube can project into the first filter chamber or into a corresponding segment of the chamber of the first filter chamber. In this embodiment, the volume range of the first filter chamber of the second partial flow is also shared. In order to be able to deliver the water, a distributor device, which has, in a special embodiment, nozzles along the perimeter of the outer pipe, is mounted preferably at the lower end of the outer tube.

The first filter chamber can be filled at least with ion exchange resin, whereas the second filter chamber is filled, for example, with activated carbon.

BRIEF DESCRIPTION OF THE DRAWINGS

Exemplary embodiments of the invention are explained in detail below with the help of the following Figures. The Figures shown are.

DETAILED DESCRIPTION OF THE INVENTION

Figure 1A:
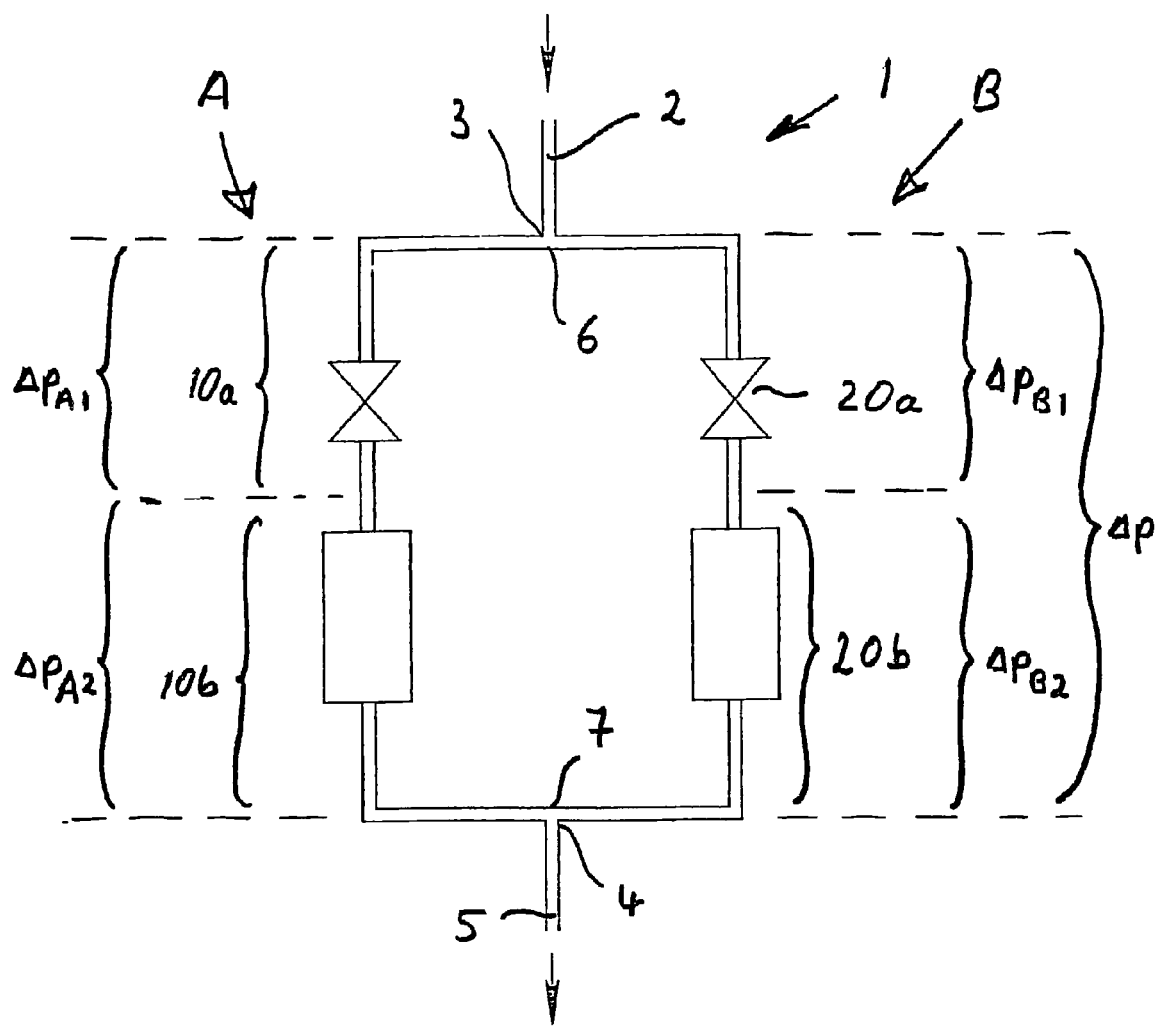
FIG. 1a illustrates a circuit diagram of a filter device with a filter line and a blending line.

The resistance circuit diagram of the filter device 1 is shown in FIG. 1a. Raw water flows through a raw water inlet 2 into the separation device 3, which divides the raw water into two partial flows. The raw water is fed to filter line A and a blending line B. The filter line A is composed of a flow channel section 10a, in which a valve symbol is shown to represent the flow characteristic, and a first filtration section 10b. Similarly, the blending line B consists of a second filtration segment 20b and a preceding segment, whose flow characteristic is determined by the distribution valve 20a.

The flow from both outlets of the filter line A and the blending line B goes into the connection device 4, which is connected to the pure water outlet 5.

The pressure decline in the filter device 1 between the branch points 6, 7 is marked with $\Delta p$. $\Delta p$ is the value obtained by adding the values $\Delta p_{A1}$, $\Delta p_{A2}$, as well as $\Delta p_{B1}$, $\Delta p_{B2}$, which represent the corresponding pressure declines in the segments 10a, 10b, 20b and in the distribution valve 20a.

Figure 1B:
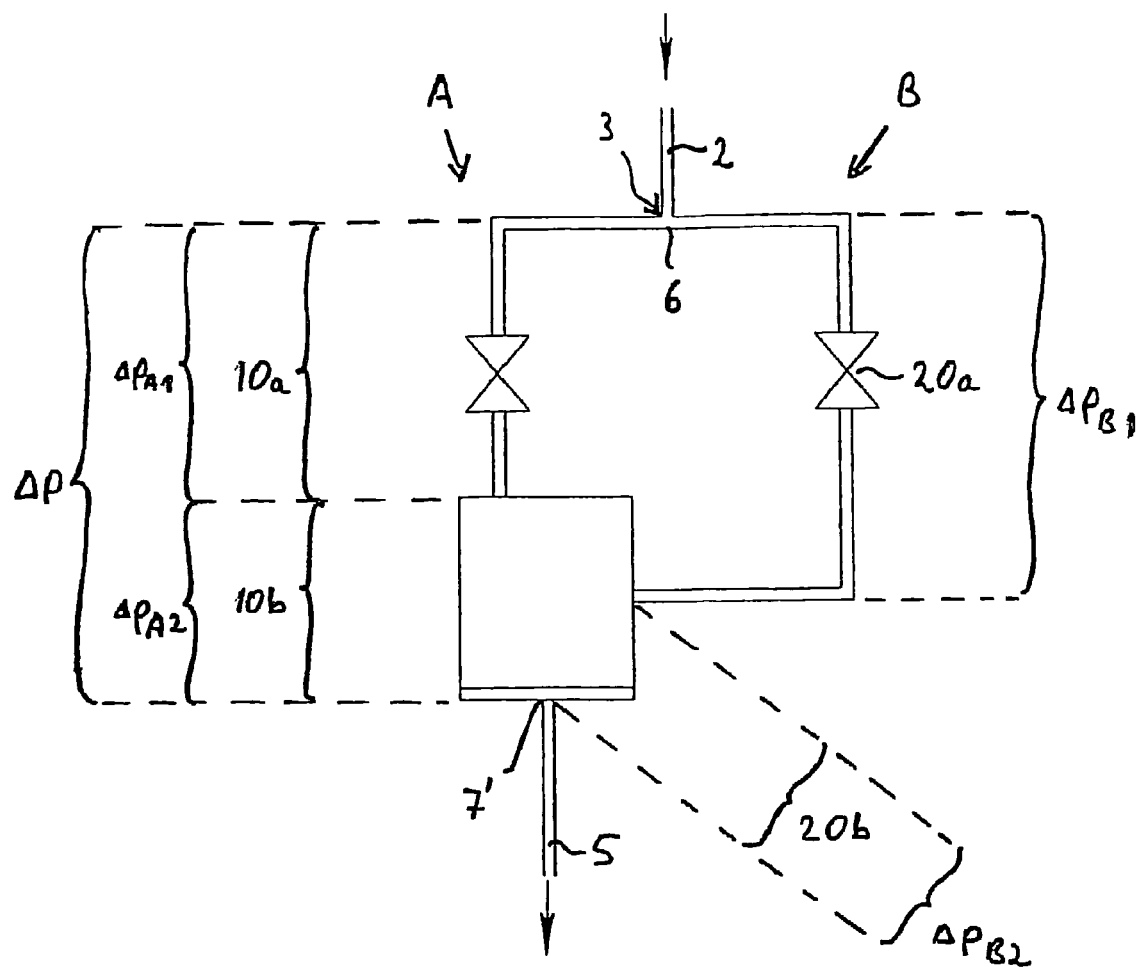
FIG. 1b illustrates a circuit diagram of a filter device with a filter line and a blending line according to an another embodiment, FIGS. 2a, b illustrate $\Delta p$-$\dot{V}$ diagrams of the individual segments of the filter line A and the blending line B, FIGS. 3a, b illustrate $\Delta p$-$\dot{V}$ diagrams for the entire filter line and the entire dilution line for dilution portion of 50% for different ranges of the volume flow.

The resistance circuit diagram of the filter device, according to another embodiment, is displayed in FIG. 1b. Flow from the blending line B goes into the filtration segment 10b, whose lower segment is used by both the partial flows and thus also forms the second filtration section 20b. It depends on the layout and the pressure conditions, how large the region of the filtration segment used by the second partial flow is, and is explained in detail in context of FIG. 10.

The pressure loss in the filter device 1 between the branching point 6 and the exit point 7' is also denoted by $\Delta p$. $\Delta p$ is the value obtained by adding the values $\Delta p_{A1}$ and $\Delta p_{A2}$ or $\Delta p_{B1}$ and $\Delta P_{b2}$, which denote the corresponding pressure declines in the segments 10a, 10b, 20b and in the distribution valve 20a.

Figure 2A:
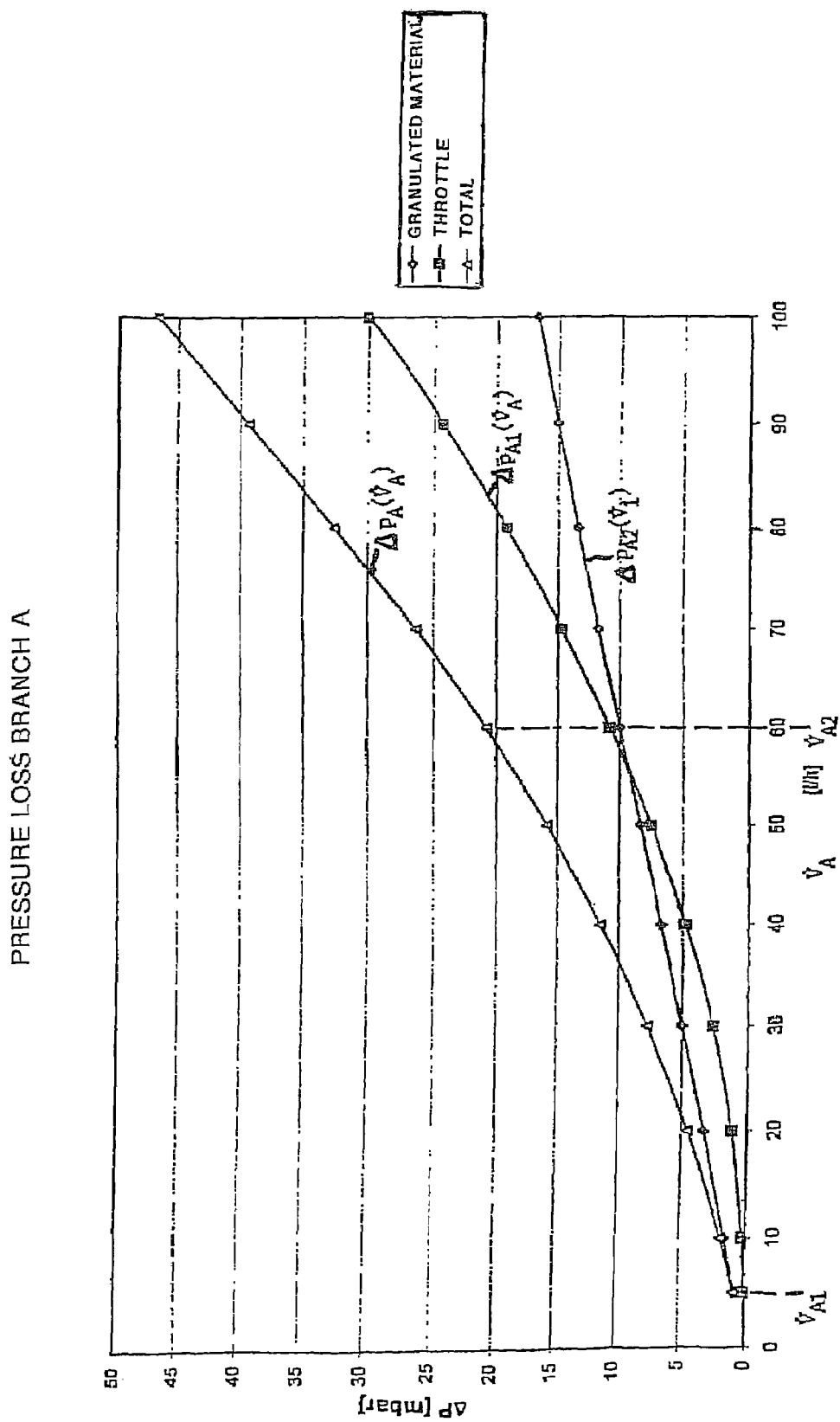
Figure 2B:
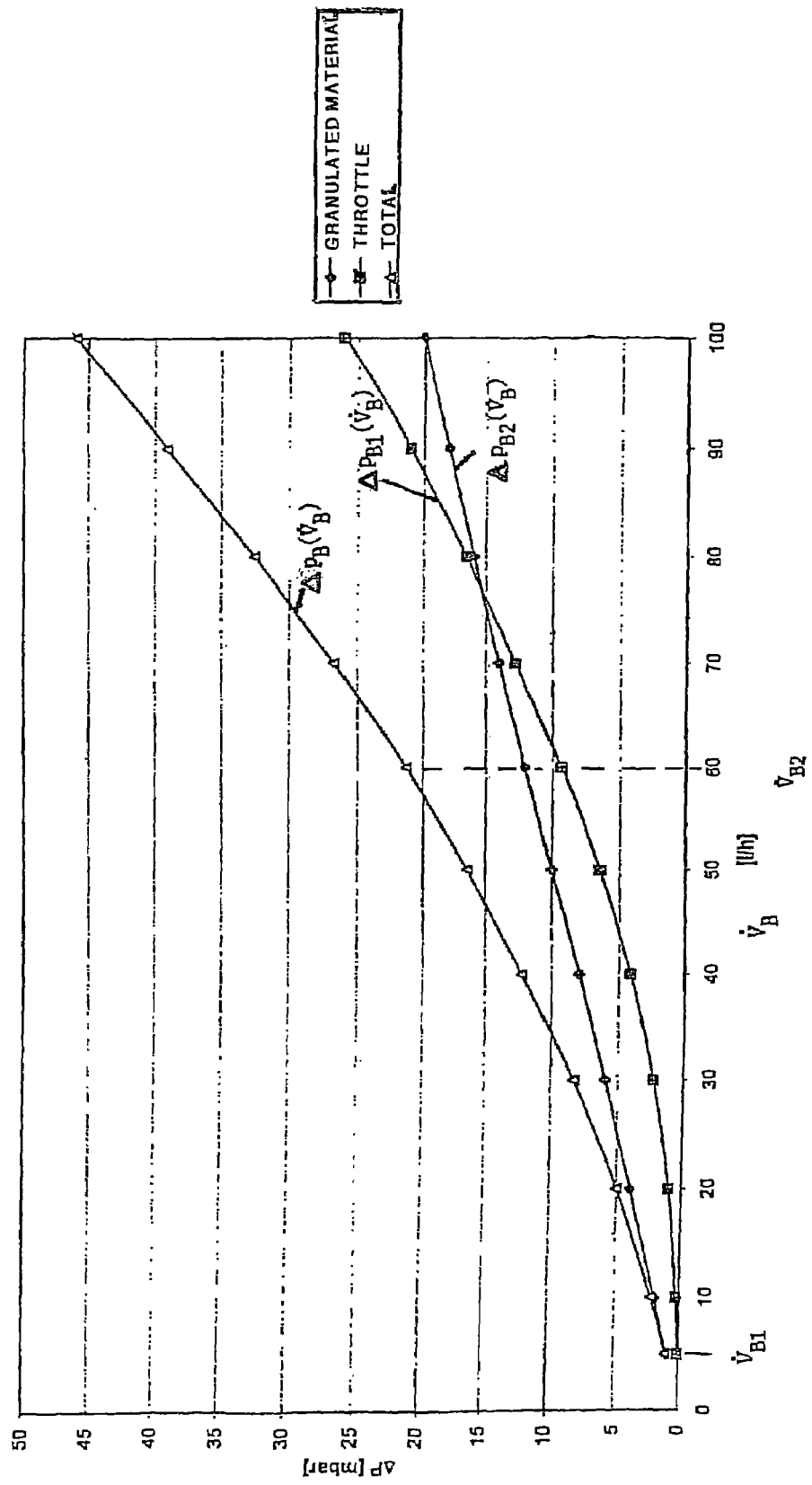

The pressure declines are functions of volume flow, as shown in the FIGS. 2a and 2b for a blend portion of 50% in the region of the first volume flow range with $\dot{V}_1=10$ liters per hour to $\dot{V}_2=120$ liters per hour. In case of 50% blending, the volume flow divides into equal parts of $\dot{V}_A$ and $\dot{V}_B$, so that the relevant ranges lie between $\dot{V}_{A1}=5$ liters per hour and $\dot{V}_{A2}=60$ liters per hour and $\dot{V}_{B1}=5$ liters per hour and $\dot{V}_{B2}=60$ liters per hour. Therefore the curves for $\dot{V}_A$ or $\dot{V}_B$ are shown only for the value range from 0 to 100 liters per hour. While the pressure loss functions $\Delta p_{A1}(\dot{V}_A)$ and $\Delta p_{B1}(\dot{V}_A)$ show a quadratic dependence, the functions $\Delta p_{A2}(\dot{V}_B)$ and $\Delta p_{B2}(\dot{V}_B)$ are linear. An inner container with a volume of 10 liters was taken as the basis for this example.

For $\dot{V}_A<55$ liters per hour, $\Delta p_{A2}(\dot{V}_A)>\Delta p_{A1}(\dot{V}_A)$, that is, the filter characteristic of the first filtration segment 10b has greater influence on the filter characteristic of the total function $\Delta p_A$ (see FIG. 2a). The second volume flow range extends in this region from $\dot{V}_1=10$ liters per hour to $\dot{V}_2=120$ liters per hour. This means that the blended condition is satisfied for the entire region from 10 to 120 liters per hour.

Figure 3B:
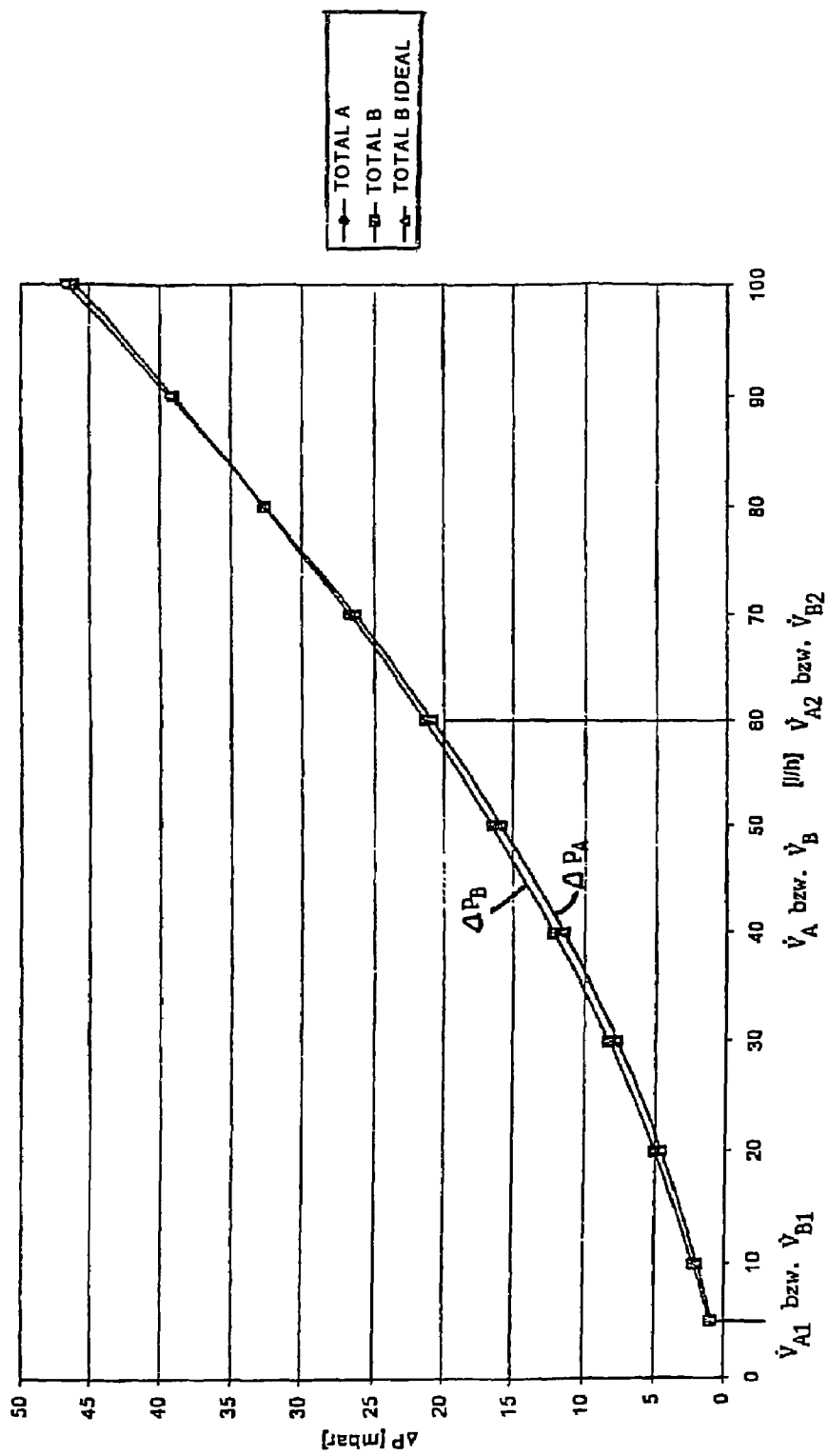

$\Delta p_B$ and $\Delta p_A$ resulting from both the functions are shown in FIGS. 3a, b. Above the value 55 liters per hour for the branch A and above 77 liters per hour for the branch B, the resulting curves are represented essentially by the parabola shaped curves of the segments 10a, 20a, while below these values, the flow characteristic of the filtration segment is the dominant quantity. This means that the distribution valve below 77 liters per hour for the branch B has only a minor influence on the behavior of the total flow.

Figure 4:
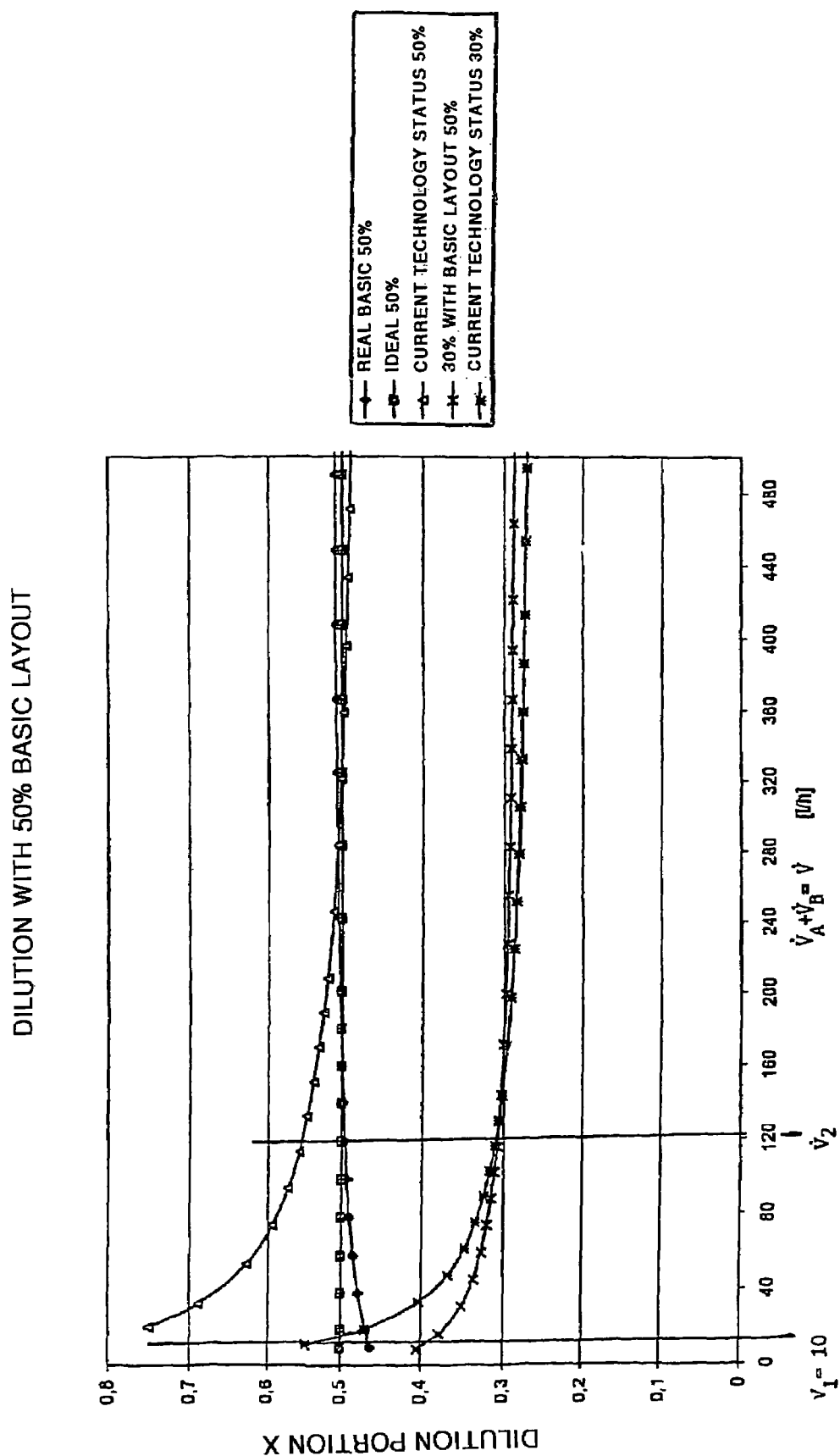
FIG. 4 is a diagram showing the blend portion in dependence of $\dot{V}$.

The two curves shown in FIGS. 3a, b do not overlap, because it is not possible to match the flow characteristics of the blending lines completely with the flow characteristics of the filter line. This has the consequence that there is a slight deviation, which leads, in the case of small volume flows, as shown in FIG. 4, to a negligible deviation from the ideal dilution curve by 4%. For this dilution portion X of 50%, however, the following condition is maintained:

$$\frac{\left|\dot{V}_B \frac{1-X}{X} - \dot{V}_A\right|}{\dot{V}_A} \leq 0.15$$

In FIG. 4, the blended portions are shown in dependence of the volume flow. In the example shown here, the basic layout of the blended portion of 50% is taken as the basis. Ideally, the blend portion must, therefore, be constant for 0.5 over the entire shown volume flow range, and should give a straight line, as it is the case with the "ideal 50%" curve. The actual "Real Basic 50%" curve shows a slight deviation of about 4% from this ideal curve for the volume flow values less than 50 liters per hour, which is clearly better than the corresponding blended curves according to the current status of the technology (Current Technology Status Ideal 50%).

By adjusting the distribution valve to a blend portion of 30%, one obtains the curve (30% for basic layout 50%), which rises, for small volume flows, and shows deviation of about 30% from the ideal value 0.3. This deviation is still distinctly smaller than that in the case of currently employed technologies (Current Technology Status Ideal 30%), whereby, for small volume flows, deviations of the blend portion greater than 50% appear.

Figure 5:
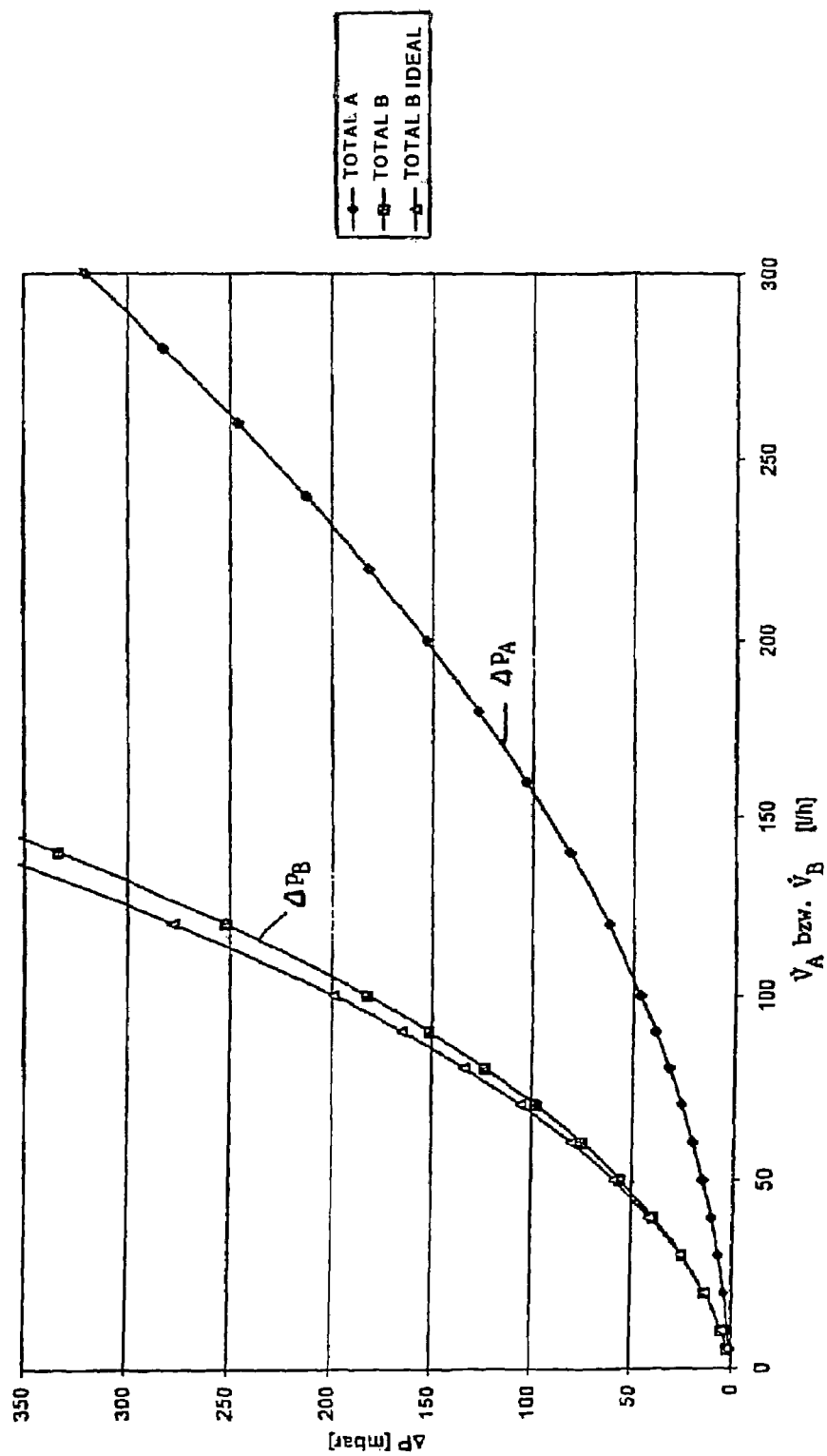
FIG. 5 is a diagram corresponding to FIG. 3a for blend portion of 30%.
Figure 6:
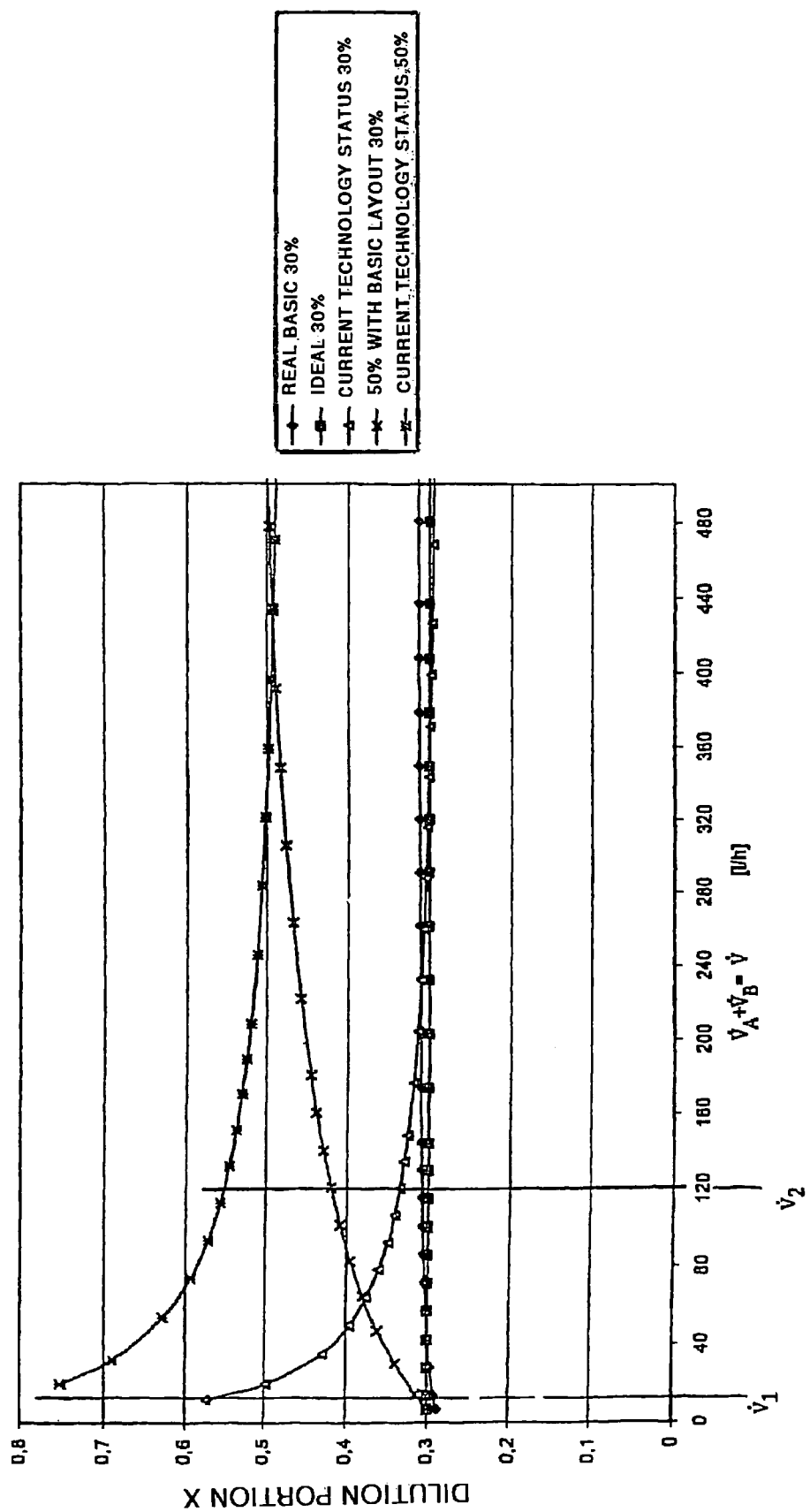
FIG. 6 is a diagram showing blend portion in dependence of the volume flow.

In FIG. 5, the curves $\Delta p_A$ and $\Delta p_B$ for the basic layout with 30% blend portion are shown. The pressure loss function APB shows a slight deviation from the ideal curve (Total B Ideal), which corresponds to the preset blend portion of 30%. This leads—as shown in FIG. 6—to the blend portion curve, which lies above the line 0.3 for large volume flows and lies below this ideal line for volume flows <50 liters per hour. The corresponding curve according to the current status of the technology (Current Technology Status Ideal 30%) shows significant increase for small volume flows.

If the distribution valve is opened further, so that a blend portion of 50% is achieved, one obtains a curve, which lies below the ideal value of 0.5. Here, the corresponding curve shows a deviation to the higher side compared to that resulting from the current status of the technology, whereby the percent-wise deviation is significantly larger compared to the design according to the invention.

With the adjustment, according to the invention, of the flow characteristic of the blending line B in the filter line A, the deviation can be maintained below +/−5% even for low volume flows for at least a blend portion X.

Figure 7:
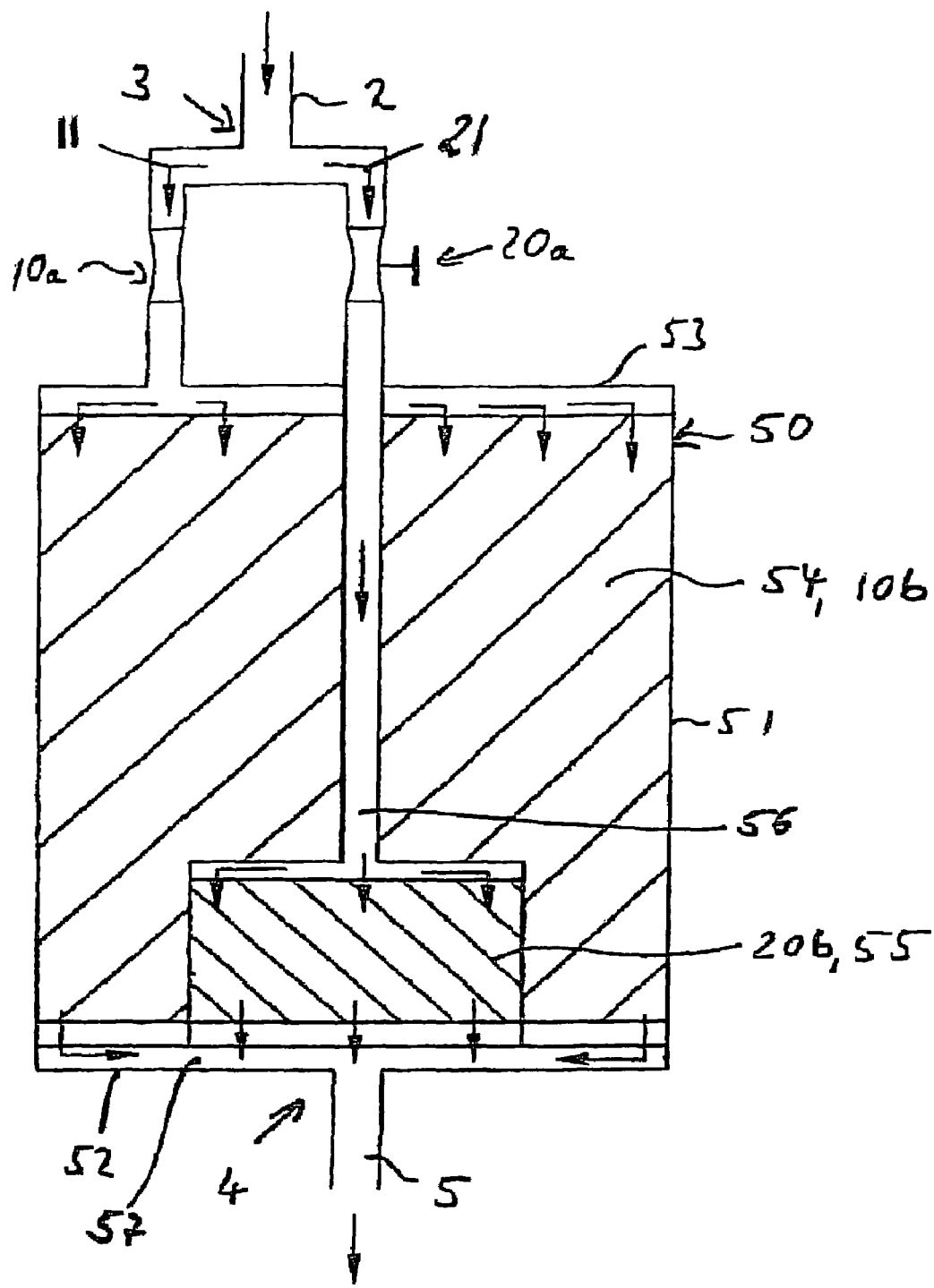
FIG. 7 is a schematic diagram showing a cross sectional view of the filter device.

FIG. 7, a vertical sectional view of the filter device 1 is shown. In the upper region, the raw water inlet 2 is shown, which leads the flow into the separation device 3, which divides the inflowing raw water into two partial flows. The left partial flow flows through the flow channel segment 10a and the flow from the first inlet 11 flows into the inner container 50, whose interior space is essentially formed by the first filter chamber 54, which forms the filtration segment 10b. The raw water, which flows through the flow channel segment 10a divides between the lid 53 and the filter material of the filter chamber 54 below that, and penetrates through the filter material, until it exits from the lower side and, where it is collected in the main collection chamber 57, and wherefrom it flows out through the pure water outlet 5 of the connecting device 4.

The first filter chamber 54 surrounds the second filter chamber 55, which forms the second filtration segment 20b. The layout is concentric, whereby the second filter chamber 55 is encircled in annular form by the first filter chamber 54. Both filter chambers extend up from the region of the bottom wall 52, whereby the second filter chamber 55 has a smaller volume compared to the first filter chamber 54. The second partial flow, which flows through the distribution valve 20a, passes through the second inlet 21 and the inlet pipe 56 of the second filter chamber 55. The water streaming through the second filter chamber 55 is also collected at the lower side in the main collection chamber 57 through the bottom wall 52, and flows together with the water flowing out of the first filter chamber 54 through the pure water outlet 5.

Figure 8:
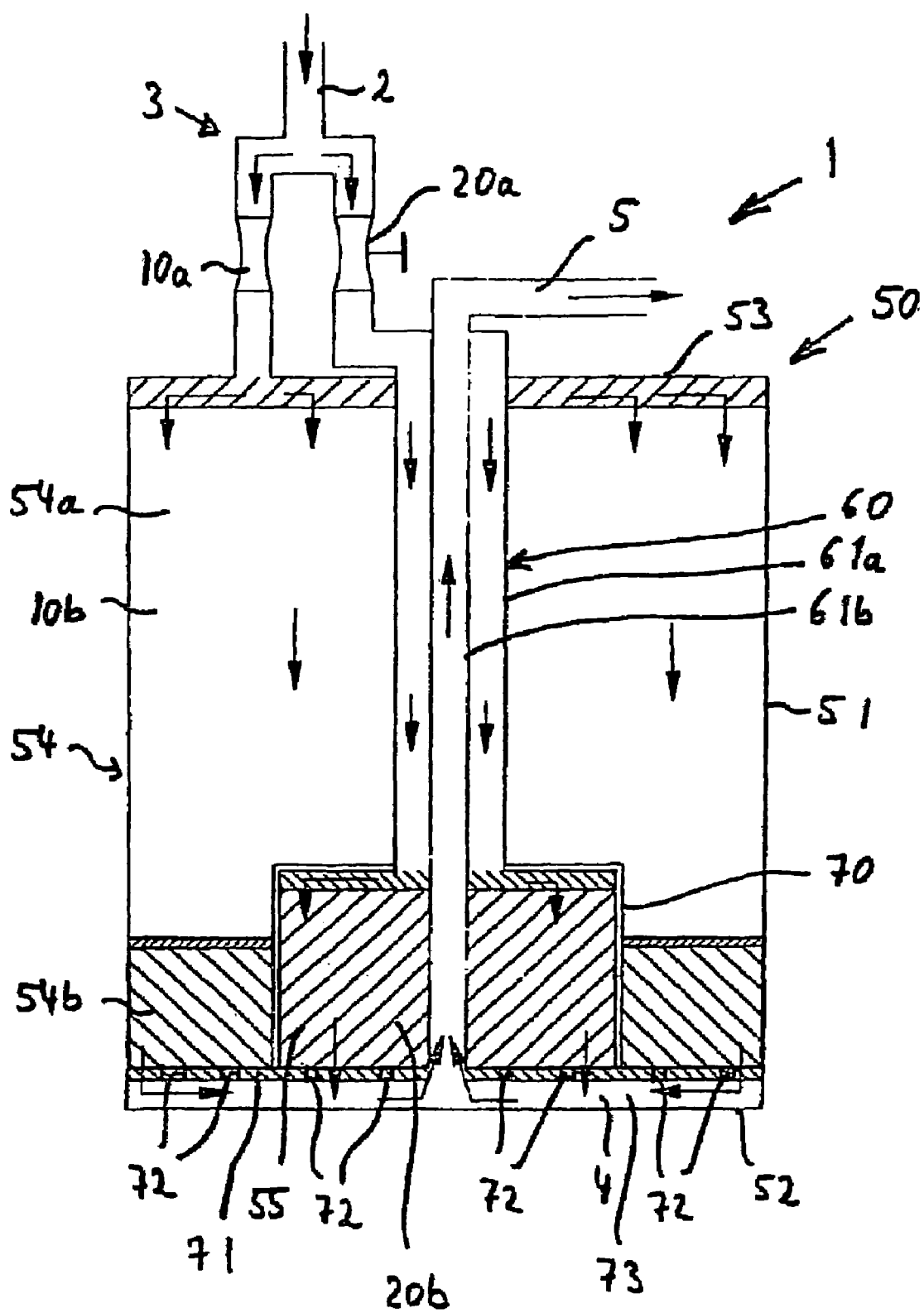
FIG. 8 illustrates a cross section of the filter device with the inserts.

In FIG. 8, a schematic vertical sectional view of a filter device 1 is shown, which is comprised of an inner container 50, in which, essentially the filtration segments 10b and 20b are arranged. The raw water inlet 2 leads to a separation device 3, in which the inflowing raw water is divided into two partial flows.

One partial flow flows through the flow channel segment 10a of the first filter chamber 54 into the inner container 50. The second partial flow flows through the distribution valve 20a through a double-walled pipe 60, arranged in the center in the inner container 50, and flows through the outer pipe 61a down to the second filter chamber 55.

The first chamber 54 forms the inner space of the inner container 50 in the upper region, which is subdivided into an upper chamber segment 54a and a lower chamber segment 54b, in which different filter materials are arranged. In the lower region, the second filter chamber 55 is mounted, which is encircled in annular form by the first filter chamber 54. A drainage plate 71, which has filtrate orifices 72, is mounted with spacing to the bottom wall 52. The filtered water can thus flow out downwards both through the first filter chamber 54, as well as through the second filter chamber 55 and collects between the drainage plate 71 and the bottom wall 52. These collection channels 73 are formed by the drainage plate 71, which form the connecting device 4. The filtered water collected from the filter line A and the blending line B is discharged upwards through the common outlet formed by the inner pipe 61b and flows into the pure water outlet 5. The second filter chamber 55 is encircled by the cupular inserted chamber 70. Between the cupular chamber 70 and the lid 53, the double-walled pipe 60 is arranged.

Figure 9:
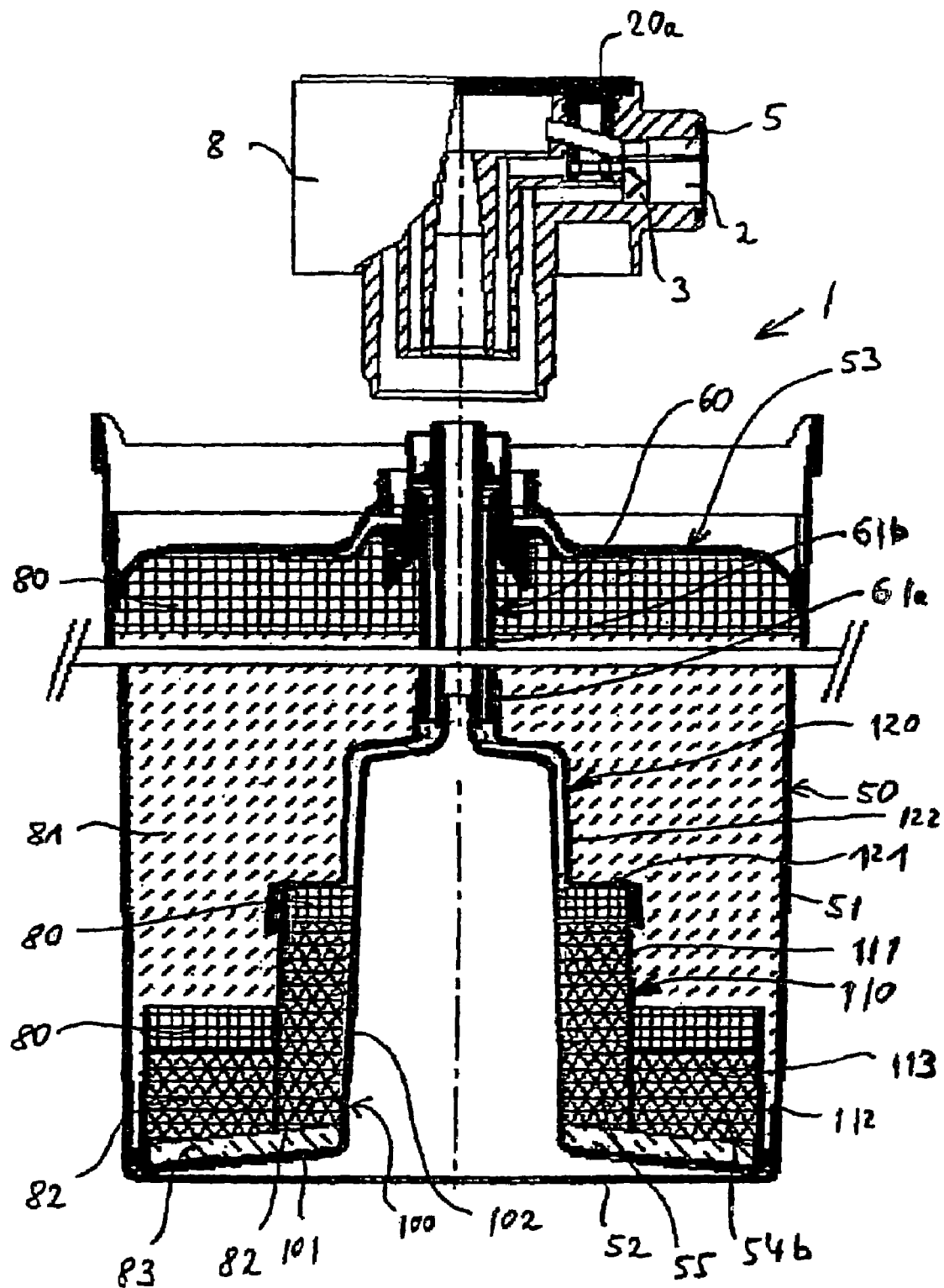
FIG. 9 illustrates a cross section of the filter device according to other layouts.

In FIG. 9, a vertical cross section of the filter device according another embodiment is shown. In the upper part, a part of the filter head 8 can be seen, which comprises of the raw water inlet 2, the separation device 3, the distribution valve 20a and the pure water outlet 5.

This head 8 is mounted on the double-walled pipe 60 projecting above, which consists of an outer pipe 61a and an inner pipe 61b. This double-walled pipe 60 is fixed in the lid 53 of the inner container 50. Below the lid is a distribution medium in the form of a nonwoven fabric, which also serves the function of fixing the ion exchanger material below it. It is thus possible to operate the filter device 1 not only vertically but also horizontally.

In the interior space, besides the double-walled pipe 60, essentially three components are present. The inner bowl 100 consists essentially of a cylindrical or conical wall 102, which tapers to the upside, and latches into the inner pipe 61a. The wall 102 runs downwards, into the ring-shaped mesh bottom plate 101, taking support of the bottom wall 52. The inner bowl 100 is encircled by a filter bowl 110, which comprises essentially of an inner ring wall 111 and an outer ring wall 112, which are connected with each other through a crosswise spacer 113. Between the inner ring wall 111 and the cylinder wall 102, a second filter chamber 55 is mounted, which is filled with granulated activated carbon 82. Between the inner ring wall 111 and the outer ring wall 112, chamber segment 54b is built, which is also filled with granulated activated carbon 82. Below granulated activated carbon 82, there is an annular shaped tight interlacing, which serves as the particle filter 83. This particle filter 83 lies immediately on the mesh bottom plate 101.

At the upper side it is encompassed by an outer bowl 120, which also comprises essentially a cylindrical wall 122, which tapers on the upside, and encompasses the outer pipe 61b. The wall 122 goes downwards into a ring-shaped cap like cover 121, which overlaps the inner ring-wall 111 of the filter bowl 110. Below the cover 121, another distributor medium 80 can be present. Also on the spacings 113, there is a distributor medium 80.

Figure 10:
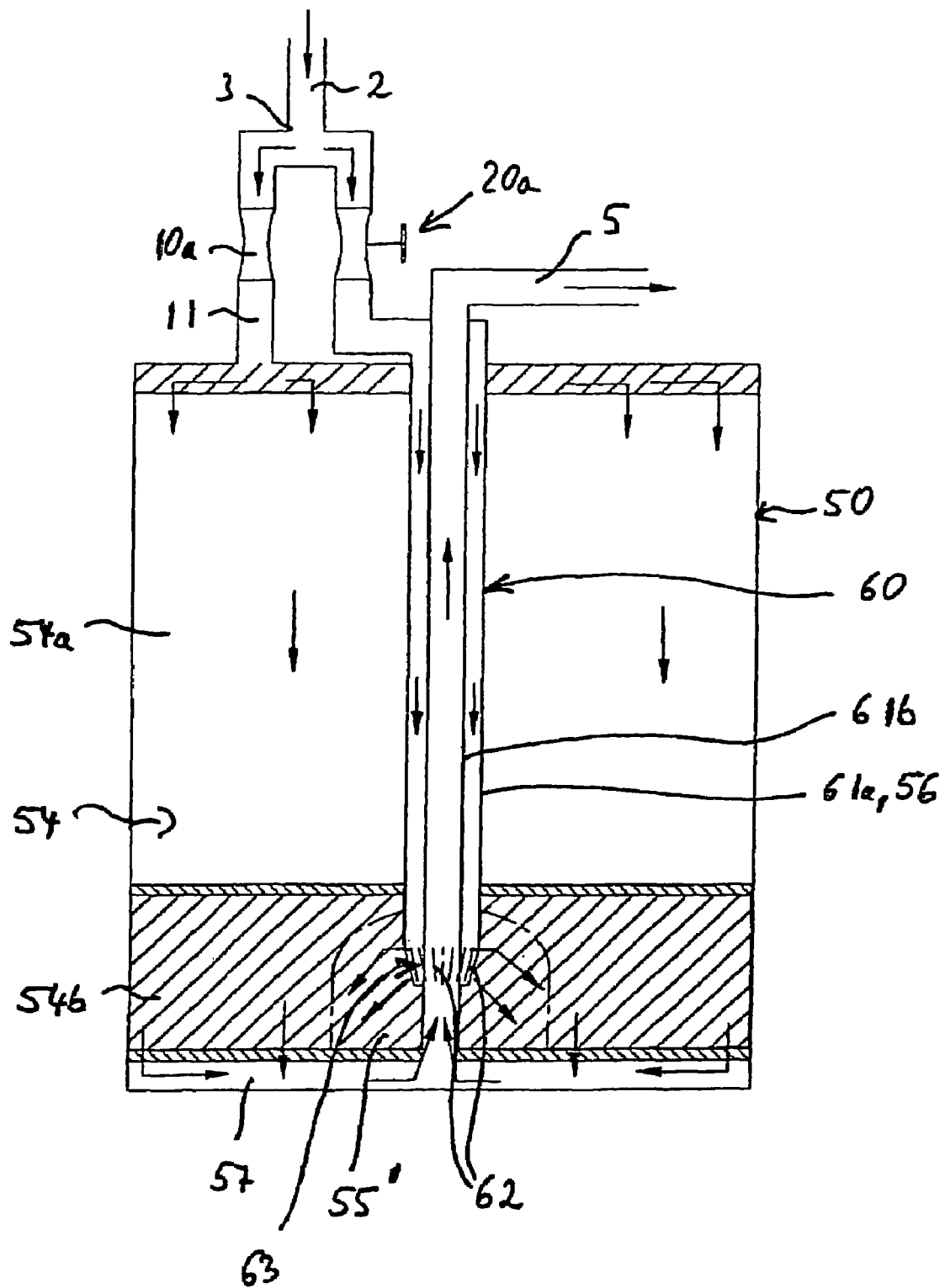
FIG. 10 illustrates a cross section of the filter device according to the schematic diagram in FIG. 1b.

In FIG. 10, yet another embodiment of the filter device 1 is shown, which corresponds to the schematic diagram of the FIG. 1b. The filter chamber 54 is subdivided in this case also, as in FIG. 8, into two chamber segments 54a, b. From the main collection drain 57 flows the filtered pure water to the inner pipe 61b through the double-walled pipe 60, upwards to the pure water outlet 5. Above the ring space between the inner pipe 61b and the outer pipe 61a, the second partial flow flows in—as shown in FIG. 8. The outer pipe 61a is built with a cone like shape at the lower end and is closed and has there nozzles 62 distributed along its perimeter, through which water from the second partial flow flows in into the chamber segment 54b. The water exiting from the distributor device 63 fills the bell shaped volume region 55' within the chamber segment 54b shown with dotted line, which corresponds to the second filter chamber 55 in FIGS. 8 and 9. Depending on the type, build and layout, the nozzles 62, as well as, depending on the pressure, a smaller or a larger volume region 55' of the chamber segment 54b is used. In the transition zone between the volume region 55' and the remaining volume zone of the chamber segment 54b, a small mixed zone can form, which is however negligible, in which both partial flows, can mix.

REFERENCE SYMBOLS

| | |
|---|---|
| 1 | Filter Device |
| 2 | Raw Water Inlet |
| 3 | Separation Device |
| 4 | Connection Device |
| 5 | Pure Water Outlet |
| 6 | Branching Point |
| 7 | Branching Point |
| 7' | Exit Point |
| 8 | Filter Head |
| A | Filter Line |
| B | Blending Line |
| 10a | Flow Channel Segment |
| 10b | Filtration Segment |
| 11 | First Inlet |
| 20a | Distribution Valve |
| 20b | Filtration Segment |
| 21 | Second Inlet |
| 30 | Connecting Armature |
| 40 | Pressure Vessel |
| 50 | Cartridge, Inner Container |
| 51 | Surrounding Wall |
| 52 | Bottom Wall |
| 53 | Lid |
| 54 | First Filter Chamber |
| 54a,b | Chamber Segment |
| 55 | Second Chamber Segment |
| 55' | Volume Range |
| 56 | Supply Pipe |
| 57 | Collection Chamber |
| 60 | Double-Walled Pipe |
| 61a | Outer Pipe |
| 61b | Inner Pipe |
| 62 | Nozzle |
| 63 | Distributor Device |
| 70 | Cupular Insert Chamber |
| 71 | Drainage Plate |
| 71 | Filtrate Orifices |
| 73 | Main Channel |
| 80 | Distributor Medium |
| 81 | Ion Exchanger |
| 82 | Granulated Active Coal |
| 83 | Particle Filter |
| 100 | Inner Bowl |
| 101 | Ring-shaped Mesh Bottom Plate |
| 102 | Wall |
| 110 | Filter Beaker |
| 111 | Inner Ring wall |
| 112 | Outer Ring wall |
| 113 | Crosswise Spacer |
| 120 | Outer Beaker |
| 121 | Ring-shaped Cover |
| 122 | Wall |

What is claimed is:

1. A filter device for purification and/or for at least partial dealkalization of raw water, comprising:

a raw water inlet and a pure water outlet, a filter line A having one flow channel segment and a first filtration segment, and a blending line B having an adjustable distribution valve and a second filtration segment, wherein the filter line A and blending line B are connected to raw water inlet by a separation device that divides the raw water inlet into two partial flows of the filter line A and the blending line B, wherein the adjustable distribution valve is separate from the separation device and located in blending line B downstream from the separation device, and wherein the filter line A and blending line B are connected to a pure water outlet by a connection device, wherein both filtration segments are arranged in an inner container, wherein flow characteristics of components of the blending line B, defined by the pressure loss function $\Delta p_B(\dot{V}_B)$, is adapted utilizing the adjustable distribution valve and the second filtration segment, to a flow characteristic of components of the filter line A, defined by the pressure loss function $\Delta p_A(\dot{V}_A)$, in such a manner, that for at least one blended portion X with $X=\dot{V}_B/(\dot{V}_A+\dot{V}_B)$, for volume flows of a first volume flow range between $\dot{V}_1=10$ l/h to $\dot{V}_2=120$ l/h, for at least a second volume flow range having a range of at least 5 l/h within the first volume flow range, a blend condition:

$$\frac{\left|\dot{V}_B \frac{1-X}{X} - \dot{V}_A\right|}{\dot{V}_A} \leq 0.15 = G$$

is satisfied, whereby G represents a threshold value of the blended condition, $\Delta p_A(\dot{V}_A)$ the pressure loss in the filter line A and $\Delta p_B(\dot{V}_B)$ a pressure loss in the blending line B, in dependence of the volume flows $\dot{V}_A$, $\dot{V}_B$ in liters per minute of water in the lines A and B.

2. The filter device according to claim 1, wherein the distribution valve (20a) and the second filtration segment (20b) are designed in such a fashion that in the second volume flow range: $\Delta p_{B1}(\dot{V}_B)<\dot{V}p_{B2}(\dot{V}_B)$ is fulfilled, whereby $\Delta p_{B1}(V_B)$ is a pressure loss function of the distribution valve (20a) and $\Delta p_{B2}(\dot{V}_B)$ is a pressure loss function of the second filtration segment (20b).

3. The filter device according to claim 2, wherein, in a fully open state, the distribution valve (20a) has a flow characteristic $\Delta p_{B1}(\dot{V}_B)$, which is adapted to a flow characteristic $\Delta p_{A1}(\dot{V}_A)$ of the flow channel segment (10a), and that pressure loss functions $\Delta p_{A2}(\dot{V}_A)$ and $\Delta p_{B2}(\dot{V}_B)$ of the first and the second filtration segments (10b, 20b) are mutually adjusted, whereby the adjustment depends on the desired blending.

4. The filter device according to claim 3, wherein a cross flow surface $Q_A$ and $Q_B$, expressed in m², and distances $h_a$ and $h_b$, expressed in m, of the first and the second filtration segments (10b, 20b), are adjusted in such a way that, for pressure loss function $D_A$ and $D_B$, expressed in kPah/m³, of the two filtration segments (10b, 20b), following relationship is satisfied:

$$D_A = \frac{X}{1-X} D_B \text{ whereby}$$

$$D_A = \int_0^{h_A} \frac{S_A(h)}{Q_A(h)} dh$$

-continued $$D_B = \int_0^{h_B} \frac{S_B(h)}{Q_B(h)} dh$$

and $S_A(h)$ and $S_B(h)$, expressed in kPah/m², are pressure loss coefficients of the filter materials.

5. The filter device according to claim 1, wherein, in a fully open state, the distribution valve (20a) has a flow characteristic $\Delta p_{B1}(\dot{V}_B)$, which is adapted to a flow characteristic $\Delta p_{A1}(\dot{V}_A)$ of the flow channel segment (10a), and that pressure loss functions $\Delta p_{A2}(\dot{V}_A)$ and $\Delta p_{B2}(\dot{V}_B)$ of the first and the second filtration segments (10b, 20b) are mutually adjusted, whereby the adjustment depends on the desired blending.

6. The filter device according to claim 5, wherein a cross flow surface $Q_A$ and $Q_B$, expressed in m², and distances $h_a$ and $h_b$, expressed in m, of the first and the second filtration segments (10b, 20b), are adjusted in such a way that, for pressure loss function $D_A$ and $D_B$, expressed in kPah/m³, of the two filtration segments (10b, 20b), the following relationship is satisfied:

$$D_A = \frac{X}{1-X} D_B \text{ whereby}$$

$$D_A = \int_0^{h_A} \frac{S_A(h)}{Q_A(h)} dh$$

$$D_B = \int_0^{h_B} \frac{S_B(h)}{Q_B(h)} dh$$

and $S_A(h)$ and $S_B(h)$, expressed in kPah/m², are pressure loss coefficients of filter materials.

7. The filter device according to claim 6, wherein, $Q_A$ lies in the range of 5 cm² to 600 cm² and $Q_B$ lies in the range of 1 cm² to 300 cm².

8. The filter device according claim 1, further comprising having filter material in filter line A or B or a combination thereof being filter granular material with average grain size in the range of 0.1 to 2 mm.

9. The filter device according to claim 1, further comprising having filter material in filter line A or B or a combination thereof being a filter block with an average pore size in the range of 0.1 to 100 µm.

10. The filter device according to claim 1, wherein outflow from the outlet of the second filtration segment (20b) flows into the first filtration segment (10b).

11. The filter device according to claim 10, wherein the outflow from the outlet of the second filter segment (20b) flows into a second half of the first filtration segment (10b).

12. The filter device according to claim 1, wherein the inner container comprises a first filter chamber (54), in which a second filter chamber (55) is arranged, whereby each filter chamber (54, 55) is connected with a partial flow flowing in from above, and below both the filter chambers (54, 55) a common collection chamber (57) with the pure water outlet (5) arranged for collection of filtered partial flows.

13. The filter device according to claim 12, wherein at least one of the filter chambers (54, 55) is subdivided into at least two chamber segments (54a, 54b), in which different filter materials are arranged.

14. The filter device according to claim 12, wherein filter materials are arranged in the common collection chamber (57) or in the pure water outlet (5), or a combination thereof.

15. The filter device according to claim 12, wherein both the filter chambers (54, 55) extend up from the common collection chamber (57), whereby the first filter chamber (54) surrounds the second filter chamber (55) in annular form.

16. The filter device according to claim 15, wherein the inner container comprises a bottom wall, wherein on the bottom wall (52) of the inner container (50), an annular drainage plate (71) with filtrate orifices (72) is mounted, which has radial collection channels (73) on the side facing the bottom wall (52), and a cupular insert chamber (70), extends upwards from the drainage plate (71).

17. The filter device according to claim 12, wherein the inner container comprises a bottom wall, wherein on the bottom wall (52) of the inner container (50), an annular drainage plate (71) with filtrate orifices (72) is mounted, which has radial collection channels (73) on the side facing the bottom wall (52), and a cupular insert chamber (70) extends upwards from the drainage plate (71).

18. The filter device according to claim 17, wherein a double-walled pipe (60) is mounted in the inner container (50).

19. The filter device according to claim 18, wherein there is an outer pipe (61a) of the double-walled pipe (60) which projects into the first filter chamber (54).

20. The filter device according to claim 19, wherein the outer pipe (61a) has a distributor device (63) in the area of the first filter chamber (54) for distribution of inflowing water.

21. The filter device according to claim 20, wherein the distributor device (63) has nozzles (62) encircling a perimeter of the outer pipe (61a).

22. The filter device according to claim 21, wherein the first filter chamber (54) is filled at least with ion exchanger resin.

23. The filter device according to claim 21, wherein the second filter chamber (55) is filled at least with activated carbon.

24. The filter device according to claim 12, wherein the first filter chamber (54) is filled at least with ion exchanger resin.

25. The filter device according to claim 12, wherein the second filter chamber (55) is filled at least with activated carbon.

* * * * *